(12) United States Patent
Okubo

(10) Patent No.: US 11,900,964 B2
(45) Date of Patent: Feb. 13, 2024

(54) DISK DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Tomokazu Okubo, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/821,922

(22) Filed: Aug. 24, 2022

(65) Prior Publication Data

US 2023/0186951 A1 Jun. 15, 2023

(30) Foreign Application Priority Data

Dec. 15, 2021 (JP) ................. 2021-203755

(51) Int. Cl.
*G11B 20/00* (2006.01)
*G11B 7/00* (2006.01)
*G11B 20/10* (2006.01)

(52) U.S. Cl.
CPC ............... *G11B 20/10027* (2013.01)

(58) Field of Classification Search
CPC ....... G11B 5/09; G11B 5/012; G11B 20/1217; G11B 20/10222; G11B 2005/0016; G11B 5/02; G11B 20/0013; G11B 7/00456; G11B 7/0125
USPC ............... 369/59.1, 59.11, 59.12; 360/46
See application file for complete search history.

(56) References Cited

U.S. PATENT DOCUMENTS

| | | | |
|---|---|---|---|
| 6,493,161 B1 * | 12/2002 | Elliott | ............... G11B 5/09 |
| 9,754,610 B2 | 9/2017 | Wilson et al. | |
| 9,905,251 B2 | 2/2018 | Liu et al. | |
| 9,978,401 B1 | 5/2018 | Rivkin et al. | |
| 10,984,822 B2 | 4/2021 | Oberg et al. | |
| 11,031,039 B1 | 6/2021 | Tang et al. | |

* cited by examiner

*Primary Examiner* — Nabil Z Hindi
(74) *Attorney, Agent, or Firm* — Knobbe Martens Olson & Bear LLP

(57) ABSTRACT

According to an embodiment, there is provided a disk device including a disk, a head, a preamplifier and a controller. The head writes information to the disk according to a write current. The preamplifier causes the write current to flow through the head. The controller is capable of causing the preamplifier to perform current zero control for maintaining an amplitude of the write current at zero, and is capable of changing a time for maintaining the amplitude of the write current at zero according to a pattern of write data.

19 Claims, 10 Drawing Sheets

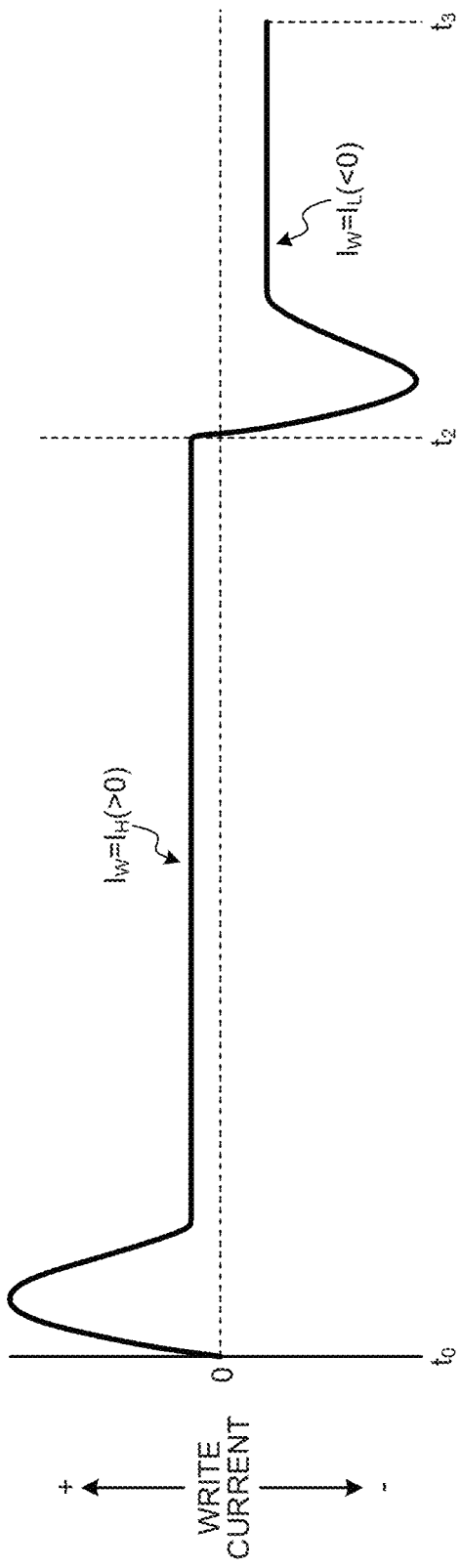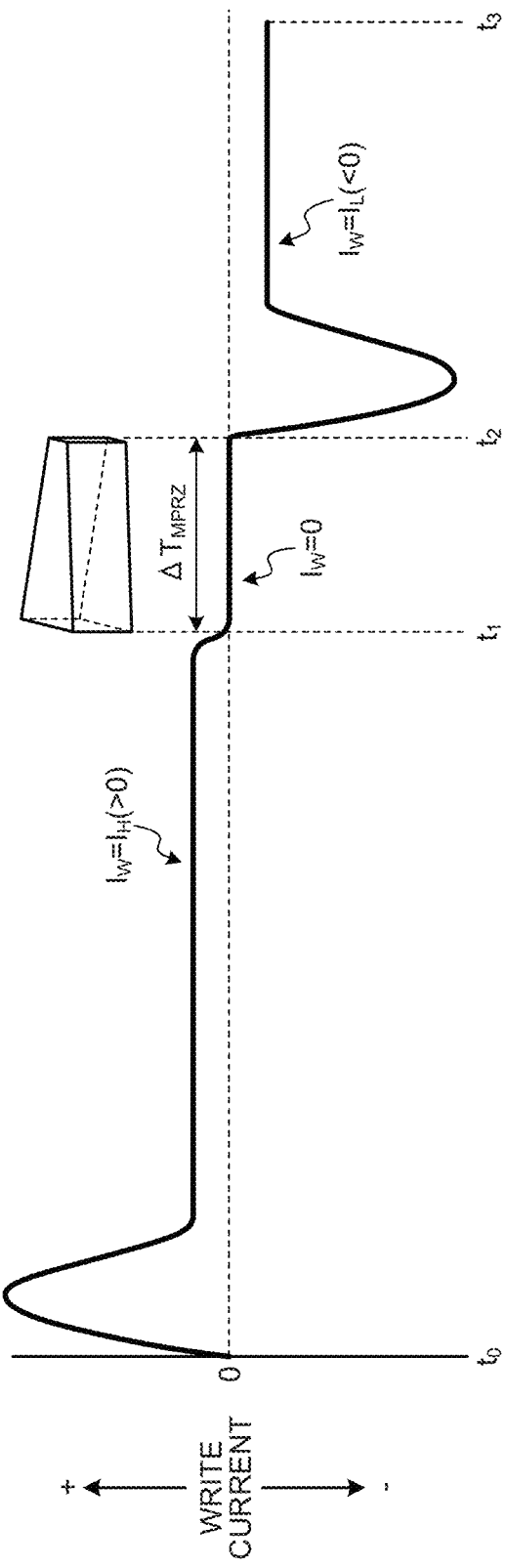

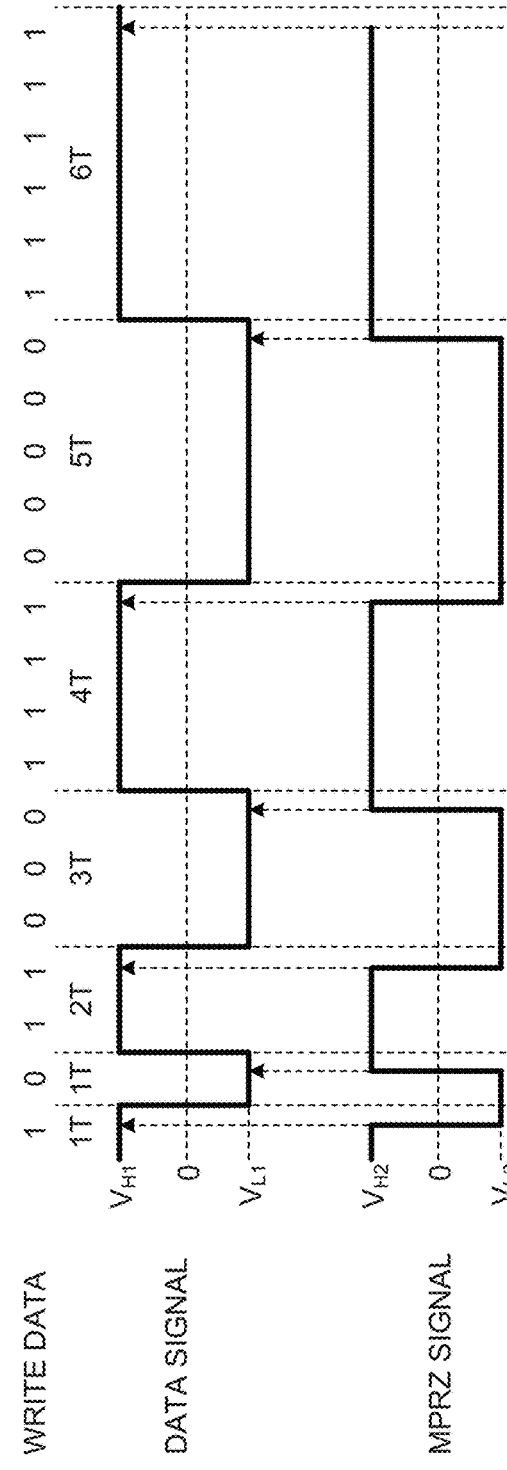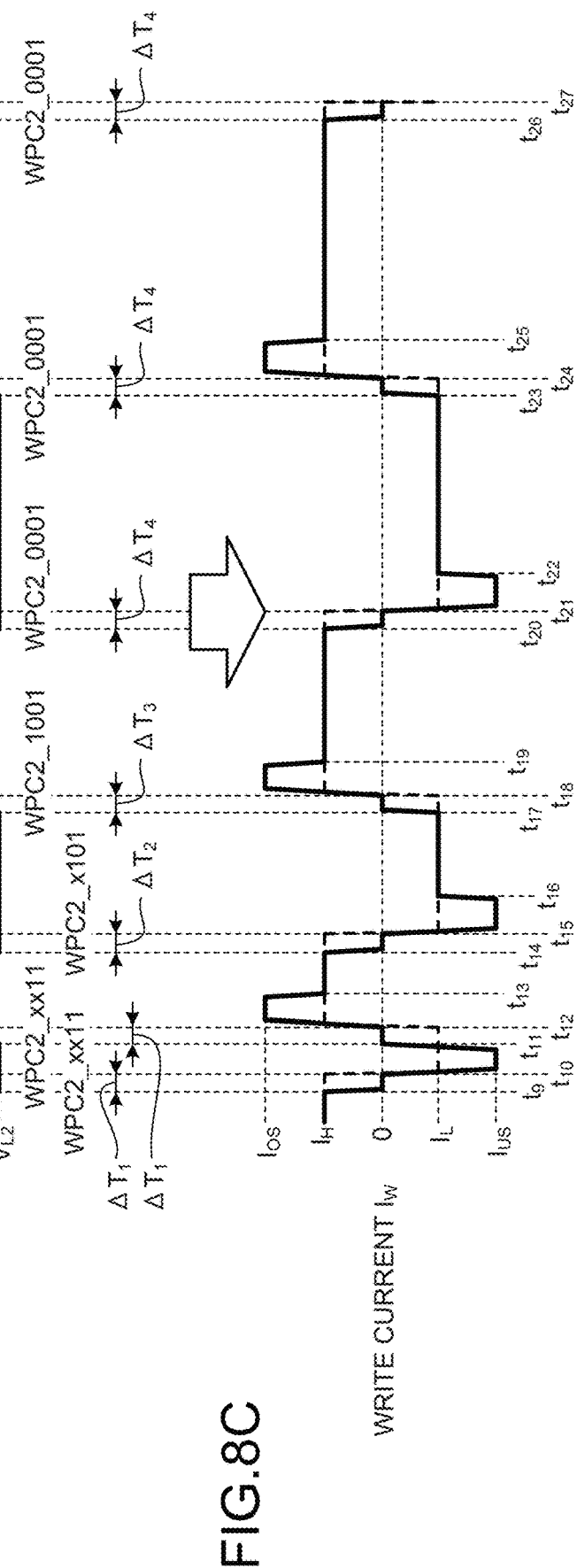
FIG.8A WRITE DATA
FIG.8B
FIG.8C

FIG.9

| DATA SIGNAL LEVEL | MPRZ SIGNAL STATE TRANSITION | CURRENT ZERO CONTROL |
|---|---|---|
| Low | Low->High | PERFORMED |
| Low | High->Low | NOT PERFORMED |
| High | Low->High | NOT PERFORMED |
| High | High->Low | PERFORMED |

WRITE
DATA

DATA
SIGNAL

WRITE
CURRENT $I_W$

WRITE
DATA

MPRZ
SIGNAL

WRITE
CURRENT $I_W$

DISK DEVICE

CROSS-REFERENCE TO RELATED APPLICATIONS

This application is based upon and claims the benefit of priority from Japanese Patent Application No. 2021-203755, filed on Dec. 15, 2021; the entire contents of which are incorporated herein by reference.

FIELD

Embodiments described herein relate generally to a disk device.

BACKGROUND

In a disk device including a preamplifier, a head, and a disk, the preamplifier causes a write current to flow through the head, and the head records information on the disk according to the write current. At this time, it is desirable to improve reliability of information recorded on the disk.

BRIEF DESCRIPTION OF THE DRAWINGS

FIGS. 3A and 3B are waveform diagrams illustrating an operation of a main pole relaxation zone (MPRZ) scheme in the embodiment;

FIGS. 8A to 8C are waveform diagrams illustrating current zero control in the embodiment;

FIG. 9 is a diagram illustrating switching information of current zero control in a modification of the embodiment.

DETAILED DESCRIPTION

In general, according to one embodiment, there is provided a disk device including a disk, a head, a preamplifier and a controller. The head writes information to the disk according to a write current. The preamplifier causes the write current to flow through the head. The controller is capable of causing the preamplifier to perform current zero control for maintaining an amplitude of the write current at zero, and is capable of changing a time for maintaining the amplitude of the write current at zero according to a pattern of write data.

Exemplary embodiments of a disk device will be explained below in detail with reference to the accompanying drawings. The present invention is not limited to the following embodiments.

Embodiment

A disk device according to an embodiment includes a preamplifier, a head, and a disk. The preamplifier causes a write current to flow through the head, and the head records information on the disk according to the write current. However, a device for improving reliability of information recorded on the disk is provided.

Figure 1:
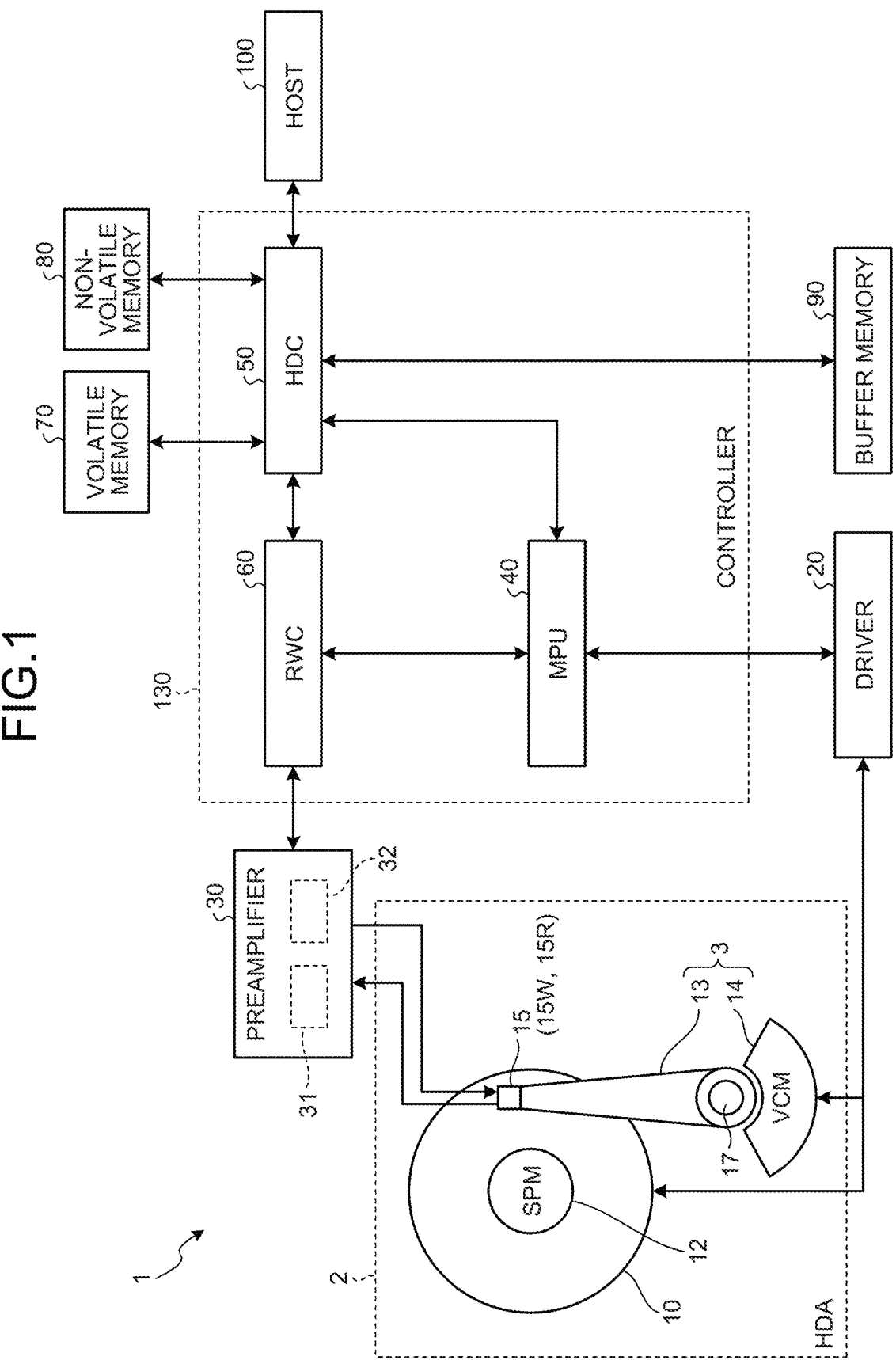
FIG. 1 is a diagram illustrating a configuration of a disk device according to an embodiment.

For example, as illustrated in FIG. 1, a disk device 1 is communicably connected to a host 100 and functions as an external storage medium of the host 100. FIG. 1 is a diagram illustrating a configuration of the disk device 1. The host 100 is, for example, an information terminal such as a computer. The disk device 1 is, for example, a disk-type storage medium such as a hard disk drive (HDD) or a magneto-optical disk drive.

The disk device 1 includes a head disk assembly (HDA) 2, a driver 20, a preamplifier 30, a volatile memory 70, a nonvolatile memory 80, a buffer memory 90, and a controller 130. The driver 20 can be configured as an integrated circuit (IC). The preamplifier 30 can be configured as an integrated circuit (IC). The controller 130 may be configured as a system on chip (SoC). The controller 130 is electrically connected to the driver 20, the preamplifier 30, the volatile memory 70, the nonvolatile memory 80, and the buffer memory 90.

The HDA 2 includes a disk 10, a spindle motor (SPM) 12, a head 15, an arm 13, and a voice coil motor (VCM) 14.

Figure 2:
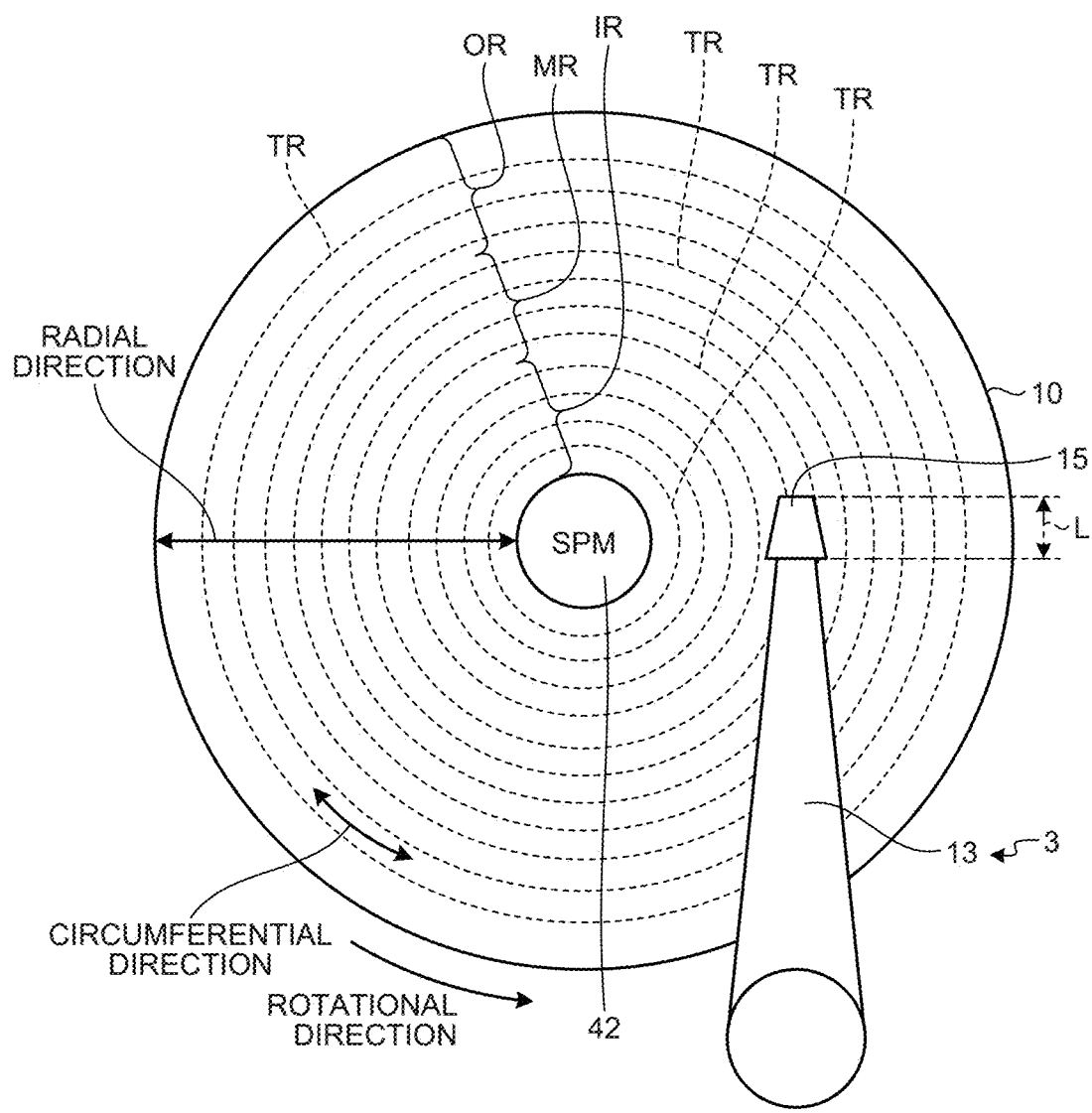
FIG. 2 is a diagram illustrating a configuration of a disk according to the embodiment.

As illustrated in FIG. 2, the disk 10 is a substantially disk-shaped medium on which information is to be recorded. FIG. 2 is a plan view illustrating a configuration of the disk 10. The disk 10 is rotatably supported by a housing (not illustrated) via a spindle. The disk 10 may be a magnetic disk or a magneto-optical disk. Hereinafter, a case where the disk 10 is a magnetic disk will be mainly exemplified. In each recording surface of the disk 10, plural tracks TR of concentric circles in a radial direction are defined by servo information written in advance in radial servo areas. An area between servo areas on each recording surface of the disk 10 is a data area where data can be written. Each track TR includes one or more sets of the servo and data areas in a circumferential direction.

The plural tracks TR can be divided into plural regions according to a position (radial position) in the radial direction. The plural regions may include an inner peripheral region IR, a middle peripheral region MR, and an outer peripheral region OR. The inner peripheral region IR includes a track TR whose radial position is radially inward. The middle peripheral region MR includes a track TR whose radial position is intermediate between the radially inner side and the radially outer side. The outer peripheral region OR includes a track TR whose radial position is radially outward.

Returning to FIG. 1, the head 15 is mounted on one end side of the arm 13. The other end of the arm 13 is rotatably supported by a shaft 17. The SPM 12 can rotationally drive the disk 10 with the spindle as a rotation center. The VCM 14 can rotationally drive the arm 13 with the shaft 17 as a rotation center. The arm 13 and the VCM 14 function as an actuator 3. The actuator 3 is capable of moving the head 15 along the radial direction with respect to the surface of the disk 10.

The head 15 includes a write head 15W and a read head 15R. The write head 15W writes information to the disk 10 according to the write current supplied from the preamplifier 30. The read head 15R reads information written on the disk 10 and supplies the information to the preamplifier 30.

The controller 130 performs overall control of the disk device 1 according to firmware stored in the nonvolatile memory 80 or the disk 10 in advance. The firmware is initial firmware and control firmware used for normal operation. The initial firmware executed first at the time of activation is stored in, for example, the nonvolatile memory 80, and the control firmware used for the normal operation is recorded in the disk 10. Under the control according to the initial firmware, the program is temporarily read from the disk 10 to the buffer memory 90 and then stored in the volatile memory 70.

The controller 130 is communicably connected to the host 100, and can perform control corresponding to a command when receiving the command from the host 100 in the normal operation. The controller 130 includes a read/write channel (RWC) 60, a microprocessor (MPU) 40, and a hard disk controller (HDC) 50. The RWC 60, the MPU 40, and the HDC 50 are electrically connected to each other.

The driver 20 controls driving of the SPM 12 and the VCM 14 according to control of the MPU 40.

The preamplifier 30 includes a read amplifier 31 and a write driver 32. The read amplifier 31 amplifies a read signal read from the disk 10 via the head 15 and supplies the amplified read signal to the RWC 60. The write driver 32 causes a write current corresponding to a data signal received from the RWC 60 to flow through the head 15. The preamplifier 30 is electrically connected to the head 15 and the RWC 60 via wiring or the like.

The MPU 40 controls each unit of the disk device 1. The MPU 40 receives a read command including a read address from the host 100 via the HDC 50, and controls a read process of reading information from a position in the disk 10 corresponding to the read address. In the control of the read process, the MPU 40 performs positioning control of the head 15 with respect to the surface of the disk 10 via the VCM 14 according to the read address, and performs control such that information is read from the disk 10 via the preamplifier 30 and the RWC 60 in a state where the head 15 is positioned on the target track TR.

The MPU 40 receives a write command including a write address from the host 100 via the HDC 50, and controls a write process of writing information corresponding to write data to a position in the disk 10 corresponding to the write address. In the control of the write process, the MPU 40 performs positioning control of the head 15 with respect to the surface of the disk 10 via the VCM 14 according to the write address, and performs control such that information corresponding to the write data is written to the disk 10 via the RWC 60 and the preamplifier 30 in a state where the head 15 is positioned on the target track TR.

The HDC 50 controls data transfer. For example, the HDC 50 controls data transfer between the host 100 and the RWC 60 in response to an instruction from the MPU 40. The HDC 50 supplies a command received from the host 100 to the MPU 40, receives a response to the command from the MPU 40, and transmits the response to the host 100.

The RWC 60 receives a read signal from the preamplifier 30, restores read data from the read signal in response to an instruction from the MPU 40, and supplies the read data to the host 100 via the HDC 50. The RWC 60 receives write data from the host 100 via the HDC 50, generates a data signal corresponding to the write data in response to an instruction from the MPU 40, and supplies the data signal to the preamplifier 30.

In the write process, the level (for example, L or H) of the data signal changes according to the value (for example, 0 or 1) of the write data, the polarity of the write current flowing through the head 15 is inverted according to the level of the data signal, and the direction of magnetization written as information to the disk 10 is inverted according to the polarity of the write current.

For example, in a period from t0 to t2 illustrated in FIG. 3A, the value of the write current is maintained at $Iw=I_H$ (>0) corresponding to the value "1" of the write data. In a period from t2 to t3, the value of the write current is maintained at $Iw=I_L$ (<0) corresponding to the value "0" of the write data. The timing t2 corresponds to a bit inversion position of the write data and corresponds to a polarity inversion position of the write current.

Here, the magnetic field generated according to the write current at the main pole in the head 15 has a spatial extent in a region (that is, the instantaneously writable region) in which the disk 10 can be magnetized. This spatial extent is called a main pole relaxation zone (MPRZ), and is expected to occupy a part of the circumferential length L of the head 15 as illustrated in FIG. 2.

Therefore, as illustrated in FIG. 3B, the waveform of the write current in the MPRZ (Main Pole Relaxation Zone) scheme includes a period (current zero time) $\Delta T_{MPRZ}$ in which the write current Iw becomes zero immediately before the polarity inversion position (timing t2) of the current waveform corresponding to the bit inversion position. The control for maintaining the write current Iw at zero is referred to as current zero control.

The current zero control is intended to avoid a delay in the magnetization response at the polarity inversion position of the write current. When the amplitude of the write current immediately before the polarity inversion position is large, the magnetomotive force for inverting the magnetization inside the head 15 increases, and as a result, the magnetization response at the polarity inversion position may be delayed. If the write current immediately before the polarity inversion position is zero, the magnetomotive force for inverting the magnetization inside the head 15 can be reduced, and as a result, a delay in the magnetization response at the polarity inversion position can be avoided.

The current zero control is based on the idea that information can be instantaneously recorded on the disk 10 even if the write current Iw is set to zero in a current zero time as a premise. According to this idea, even if the write current Iw is set to zero in the current zero time, information is instantaneously recorded on the disk 10 by the length (footprint length) since the head 15 has a constant physical size, and the recording state is not impaired. A unit period of a data signal corresponding to one bit of write data is referred to as 1T. Assuming that the length L of the main pole is completely equal to the footprint length, the current zero time $\Delta T_{MPRZ}$ is expected to be about 2T to 3T. The MPRZ scheme is often implemented by a mechanism in which the write current Iw is set to zero 1 T or more before polarity inversion. FIG. 3B is a waveform diagram illustrating the operation of the MPRZ scheme.

For example, a data pattern in which the same bit value in the original write data continues for an nT period (that is, the pattern length is nT) is referred to as an nT pattern. In the MPRZ scheme, a dummy data signal in which a dummy bit is inserted 2 to 3 bits before the bit inversion position in a pattern of 4 T or more in the original write data is generated, and a mask signal indicating the position of the dummy bit is generated. Then, the polarity inversion of the write current at the dummy bit position is prevented by masking with the mask signal while starting the current zero control at the edge timing (for example, falling edge timing) of the dummy data signal. As a result, the write current waveform of the MPRZ scheme can be realized.

In the case of the MPRZ scheme, since the dummy inversion position is used to control the timing at which the write current Iw=0, the resolution is in units of 1T in principle. In addition, since the dummy data signal and the MPRZ signal need to be modulated in conjunction with each other, it is difficult to freely change the current zero time $\Delta T_{MPRZ}$, and it is difficult to make the current zero time $\Delta T_{MPRZ}$ proper (for example, optimal).

On the other hand, the footprint length may be less than 1 T contrary to expectation. This is because the magnetic field intensity is weak on the leading edge side of the head 15, and the area where recording can be performed with sufficient overwrite (OW) is limited to the vicinity of the gap of the trailing edge. As a result, the actual footprint length may be shorter than the physical size of the head 15. Therefore, for the ideal MPRZ scheme, it is desired that the current zero time $\Delta T_{MPRZ}$ can be adjusted with a resolution smaller than 1 T.

Figure 4:
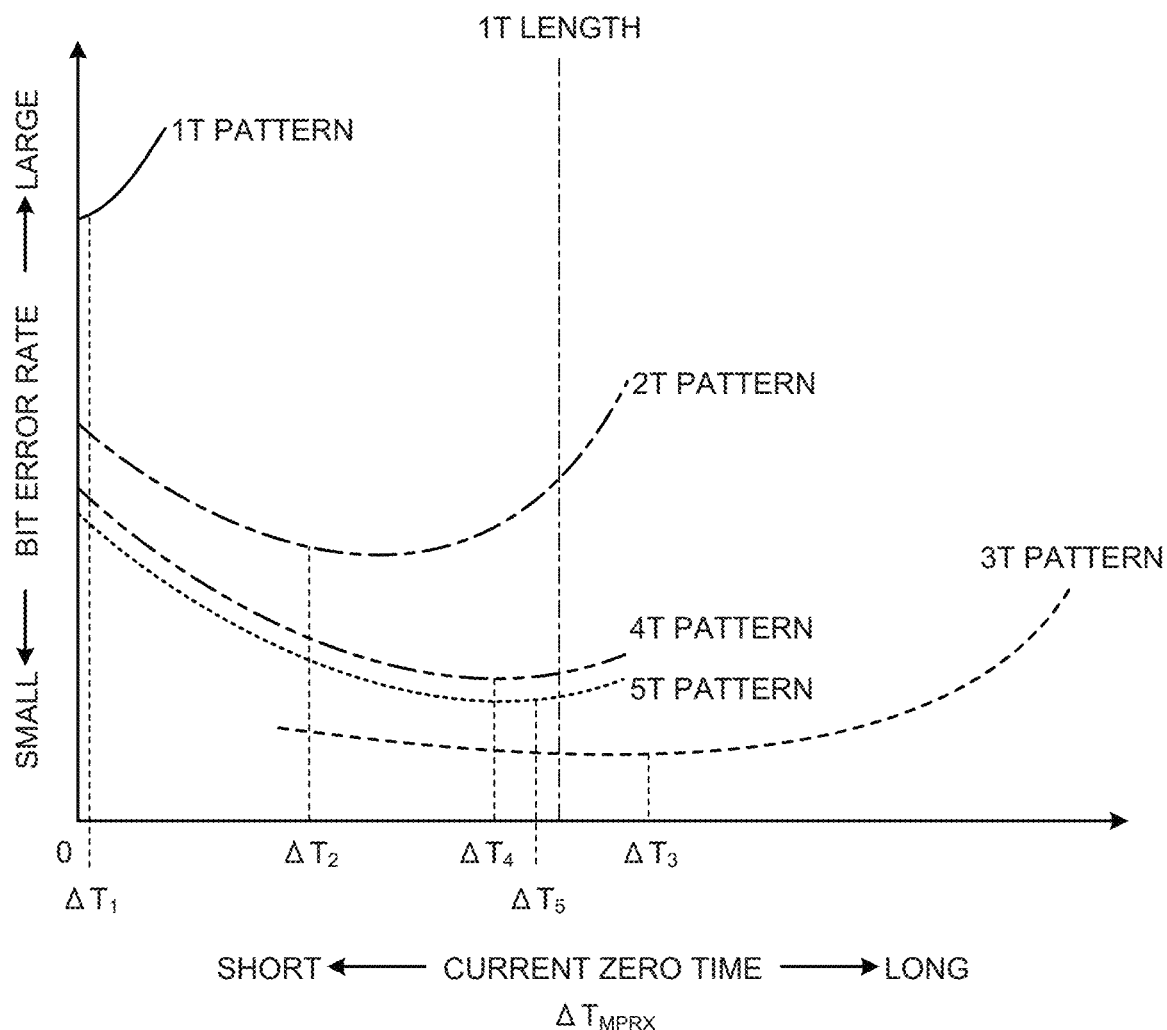
FIG. 4 is a diagram illustrating a relationship (outer peripheral region) between a current zero time and a bit error rate for each data pattern.
Figure 5:
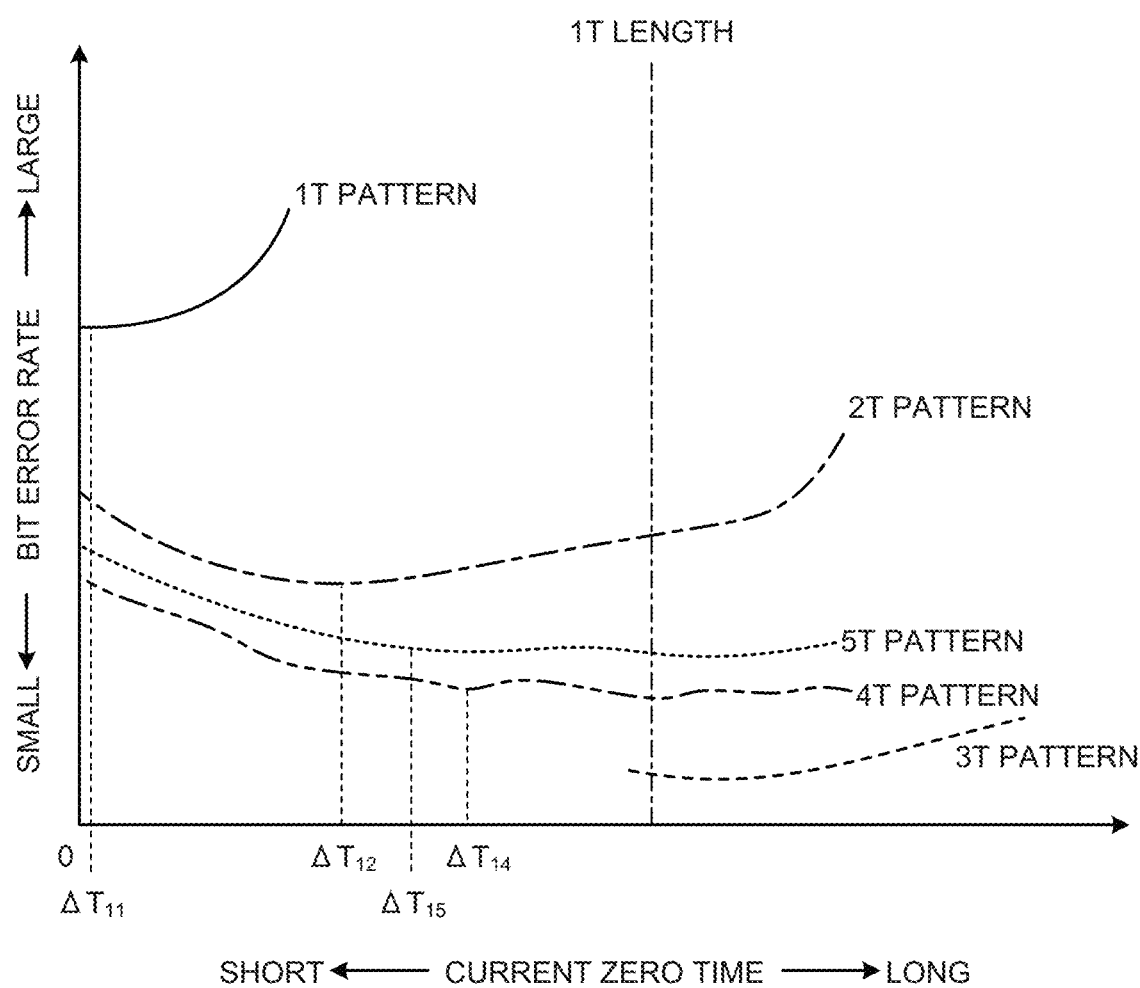
FIG. 5 is a diagram illustrating a relationship (middle peripheral region) between a current zero time and a bit error rate for each data pattern.
Figure 6:
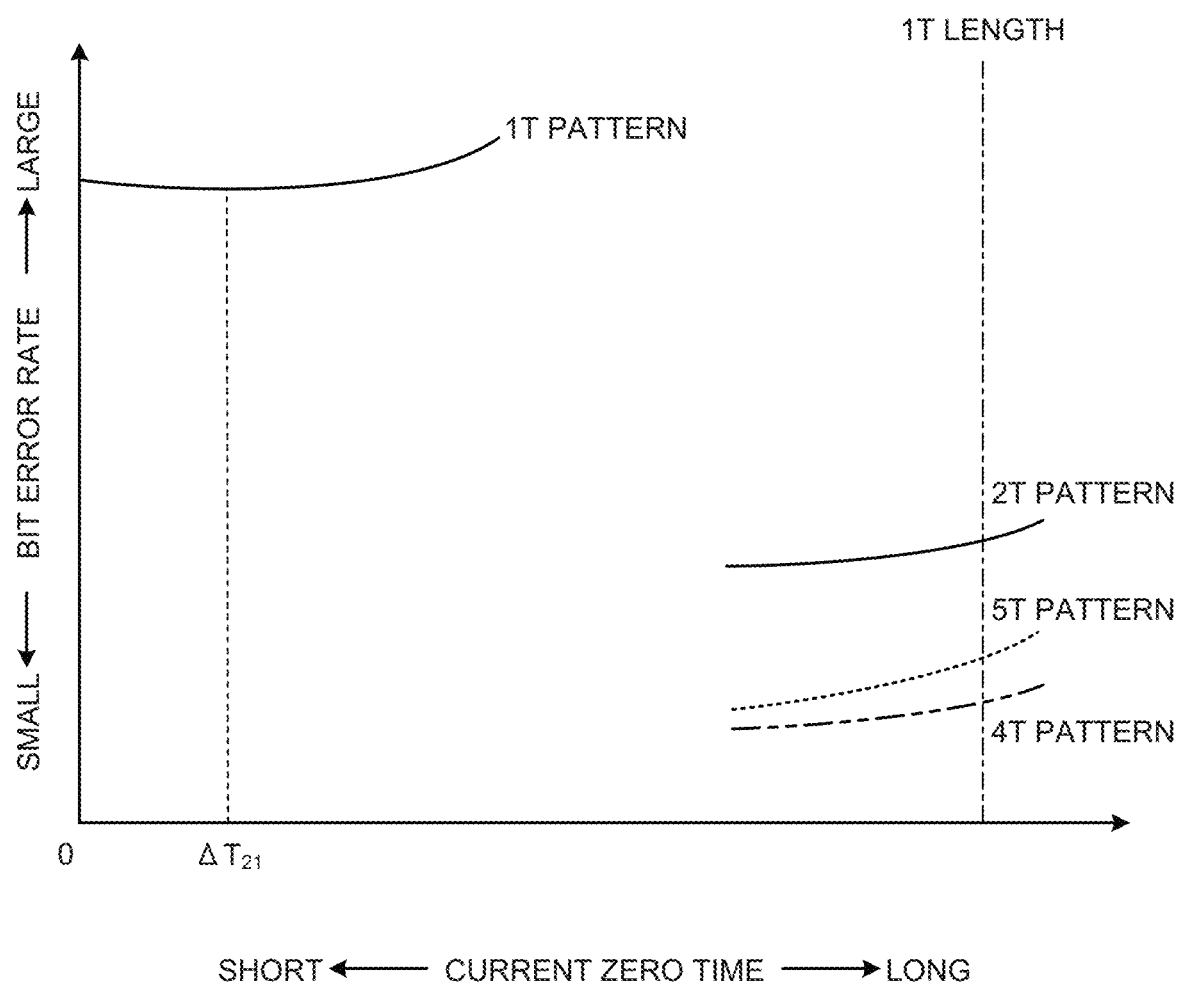
FIG. 6 is a diagram illustrating a relationship (inner peripheral region) between a current zero time and a bit error rate for each data pattern.

For example, the results of evaluating the effect of improving the magnetization response in a case where the current zero time $\Delta T_{MPRZ}$ is varied by BER (bit error rate) are illustrated in FIGS. 4 to 6. FIGS. 4, 5, and 6 are diagrams illustrating the relationship between the current zero time and the bit error rate for each data pattern for the outer peripheral region OR, the middle peripheral region MR, and the inner peripheral region IR (see FIG. 2), respectively.

In the evaluation result of the outer peripheral region OR illustrated in FIG. 4, the current zero time $\Delta T_{MPRZ}$ at which the bit error rate of the 1T pattern is minimized is $\Delta T_1$. The current zero time $\Delta T_{MPRZ}$ at which the bit error rate of the 2T pattern is minimized is $\Delta T_2$. The current zero time $\Delta T_{MPRZ}$ at which the bit error rate of the 3T pattern is minimized is $\Delta T_3$. The current zero time $\Delta T_{MPRZ}$ at which the bit error rate of the 4T pattern is minimized is $\Delta T_4$. The current zero time $\Delta T_{MPRZ}$ at which the bit error rate of the 5T pattern is minimized is $\Delta T_5$. The magnitude relationship is expressed by the following Formula 1.

$$\Delta T_1 < \Delta T_2 < \Delta T_4 < \Delta T_5 < \Delta T_3 \quad \text{Formula 1}$$

In the evaluation result of the middle peripheral region MR illustrated in FIG. 5, the current zero time $\Delta T_{MPRZ}$ at which the bit error rate of the 1T pattern is minimized is $\Delta T_{11}$. The current zero time $\Delta T_{MPRZ}$ at which the bit error rate of the 2T pattern is minimized is $\Delta T_{12}$. The current zero time $\Delta T_{MPRZ}$ at which the bit error rate of the 4T pattern is minimized is $\Delta T_{14}$. The current zero time $\Delta T_{MPRZ}$ at which the bit error rate of the 5T pattern is minimized is $\Delta T_{15}$. Note that, since the current zero time $\Delta T_{MPRZ}$ at which the bit error rate of the 3T pattern is minimized is not detected in an evaluable range, $\Delta T_3$ that is approximately the same as the outer peripheral region OR may be used. The magnitude relationship is expressed by the following Formula 2.

$$\Delta T_{11} < \Delta T_{12} < \Delta T_{15} < \Delta T_{14} < \Delta T_3 \quad \text{Formula 2}$$

In the evaluation result of the inner peripheral region IR illustrated in FIG. 6, the current zero time $\Delta T_{MPRZ}$ at which the bit error rate of the 1T pattern is minimized is $\Delta T_{21}$. Note that, since the current zero time $\Delta T_{MPRZ}$ at which the bit error rate of the 2T pattern is minimized is not detected in an evaluable range, $\Delta T_{12}$ that is approximately the same as that of the middle peripheral region MR may be used. Since the current zero time $\Delta T_{MPRZ}$ at which the bit error rate of the 3T pattern is minimized is not detected in an evaluable range, $\Delta T_3$ that is approximately the same as the outer peripheral region OR may be used. Since the current zero time $\Delta T_{MPRZ}$ at which the bit error rate of the 4T pattern is minimized is not detected in an evaluable range, $\Delta T_{14}$ that is approximately the same as that of the middle peripheral region MR may be used. Since the current zero time $\Delta T_{MPRZ}$ at which the bit error rate of the 5T pattern is minimized is not detected in an evaluable range, $\Delta T_{15}$ that is approximately the same as that of the middle peripheral region MR may be used. The magnitude relationship is expressed by the following Formula 3.

$$\Delta T_{21} < \Delta T_{12} < \Delta T_{15} < \Delta T_{14} < \Delta T_3 \quad \text{Formula 3}$$

As illustrated in FIGS. 4 to 6, the current zero time $\Delta T_{MPRZ}$ in which the effect of improving the bit error rate is optimized (for example, maximized) tends to be different for each pattern length (nT). Note that, in FIGS. 4 to 6, 1T corresponds to the value of the current zero time indicated by the straight line of the one-dot chain line, and the current zero time $\Delta T_{MPRZ}$ in which the effect of improving the bit error rate is optimized (for example, maximized) tends to be approximately near 1T or smaller than 1T. In order to optimize the improvement effect by the MPRZ scheme (for example, maximize), it is desirable that the current zero time $\Delta T_{MPRZ}$ for each data pattern (for example, a 1T pattern to a 5T pattern) can be individually adjusted.

With regard to this, in the disk device 1, the controller 130 can cause the preamplifier 30 to perform the current zero control, and the current zero time can be changed according to the pattern of the write data.

The controller 130 generates the MPRZ signal for current zero control from the write data, and adjusts the edge timing for specifying the polarity inversion position of the MPRZ signal for each pattern. The controller 130 adds a delay amount DL1 to the write data to generate a data signal. The controller 130 adds a delay amount DL2 to the write data according to the data pattern (for example, a 1T pattern to a 5T pattern) to generate the MPRZ signal. That is, the controller 130 selects, as the delay amount DL2, one corresponding to the next data pattern among the plural candidate delay amounts corresponding to the plural data patterns. All of the plural candidate delay amounts are smaller than the delay amount DL1. The controller 130 adds the selected delay amount DL2 to the write data to generate the MPRZ signal. The preamplifier generates the write current according to the data signal, starts the current zero control at the edge timing of the MPRZ signal to set the amplitude of the write current to zero, and cancels the current zero control at the polarity inversion position of the data signal.

As a result, the current zero time $\Delta T_{MPRZ}$ can be individually adjusted according to each data pattern (for example, a 1T pattern to a 5T pattern), and the effect of improving the bit error rate by the MPRZ scheme can be optimized (for example, maximized). In addition, since the current zero time can be controlled by the difference between the two delay amounts DL1 and DL2, the current zero time $\Delta T_{MPRZ}$ can be adjusted with a resolution smaller than 1T.

Figure 7:
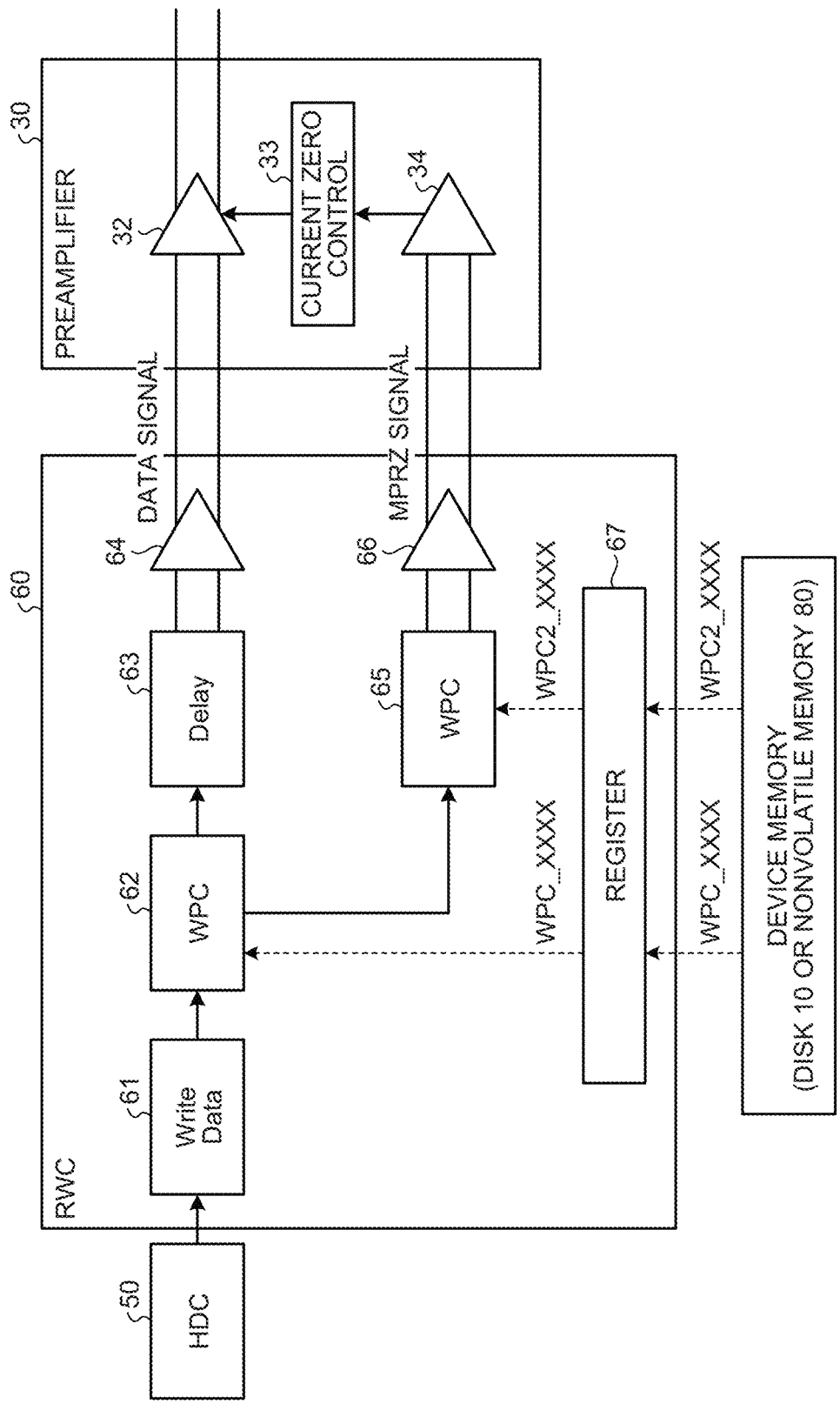
FIG. 7 is a diagram illustrating a configuration of an RWC and a preamplifier in the embodiment.

For example, in the disk device 1, the RWC 60 and the preamplifier 30 can be configured as illustrated in FIG. 7 regarding the write process. FIG. 7 is a diagram illustrating a configuration of the RWC 60 and the preamplifier 30. In FIG. 7, for the sake of simplicity, illustration of a configuration related to the read process is omitted.

The RWC 60 includes a write data generation circuit 61, a write precompensation (WPC) circuit 62, a delay circuit 63, a driver 64, a WPC circuit 65, a driver 66, and a register 67. The preamplifier 30 includes a write driver 32, a current zero control circuit 33, and a driver 34.

The write data generation circuit 61 processes a signal received from the host 100 via the HDC 50 to generate write data, and supplies the generated write data to the WPC circuit 62.

The WPC circuit 62 adds an individual delay amount to the edge timing of the write data for each data pattern. When receiving the write data from the write data generation circuit 61, the WPC circuit 62 analyzes the data pattern (for example, a 1T pattern to a 5T pattern). The controller 130 accesses a device memory in which plural first setting values are stored, acquires a first setting value WPC_XXXX corresponding to the analyzed data pattern among the plural first setting values, and sets the first setting value WPC_XXXX in the register 67.

The device memory may be, for example, an area for storing management information in the disk 10, or may be the nonvolatile memory 80. The device memory stores first setting information in which a data pattern and a first setting value are associated with each other for plural data patterns. The first setting value WPC_XXXX indicates a value of a compensation amount of Non Linear Transition Shift (NLTS). The NLTS is a phenomenon in which an information bit recorded in the disk 10 is affected by a magnetic field of an information bit immediately before or several bits before the information bit, and a bit inversion position is nonlinearly shifted with respect to time. Therefore, the value of the compensation amount of the NLTS may vary depending on the data pattern. Which data pattern corresponds to which NLTS compensation amount value is experimentally determined in advance and included in the first setting information. "XXXX" in "WPC_XXXX" indicates a value of the compensation amount to be added to the data pattern. The first setting value WPC_XXXX can be stored in the register 67 inside the RWC 60, and is set from the device memory to the register 67 in the RWC 60 during the write operation.

The WPC circuit 62 corrects the bit inversion position of the write data with a compensation amount corresponding to the first setting value WPC_XXXX. The WPC circuit 62 supplies the corrected write data to the delay circuit 63, duplicates the corrected write data, and supplies the duplicated write data to the WPC circuit 65.

The delay circuit 63 generates a data signal by delaying the corrected write data by the delay amount DL1. The delay amount DL1 is usually larger than the compensation amount of the NLTS. The delay circuit 63 supplies the data signal to the driver 64. The driver 64 transfers the data signal to the preamplifier 30.

The WPC circuit 65 generates the MPRZ signal by delaying the bit inversion position of the corrected write data by the delay amount DL2 corresponding to a second setting value WPC2_XXXX stored in the register 67 inside the RWC 60. The controller 130 accesses the device memory in which the plural second setting values are stored, acquires a second setting value WPC2_XXXX corresponding to the data pattern analyzed by the WPC circuit 62 among the plural second setting values, and sets the second setting value WPC2_XXXX in the register 67.

The device memory stores second setting information in which a data pattern and a second setting value are associated with each other for plural data patterns. The second setting information may be information in which the data pattern and the second setting value are associated with each other for a combination of plural data patterns and plural regions (for example, outer peripheral region OR, middle peripheral region MR, and inner peripheral region IR). The second setting value WPC2_XXXX indicates a value of a delay amount for adjusting the start timing of the current zero time. Which data pattern (or which combination of data pattern and region) corresponds to the value of the compensation amount of which NLTS is experimentally determined in advance and included in the second setting information (see FIGS. 4 to 6). "XXXX" in "WPC2_XXXX" indicates a value of a delay amount to be provided to the data pattern. The second setting value WPC2_XXXX can be stored in the register 67 inside the RWC 60, and is set from the device memory to the register 67 in the RWC 60 during the write operation.

The WPC circuit 65 can add the delay amount DL2 (WPC2_XXXX) to the corrected write data independently of the addition of the compensation amount (WPC_XXXX) of the NLTS by the WPC circuit 62. The MPRZ signal indicates the start timing of the current zero time at the edge timing. As a result, the WPC circuit 65 can individually adjust the current zero time for each nT pattern.

At this time, the WPC circuit 65 desirably secures an adjustment width of at least 1 T or more. Therefore, the delay amount DL1 is added to the corrected write data to which the compensation amount of the NLTS is added by the delay circuit 63 for overall phase adjustment with the MPRZ signal.

The WPC circuit 65 supplies the MPRZ signal to the driver 66. The driver 66 transfers the MPRZ signal to the preamplifier 30.

The driver 34 of the preamplifier 30 receives the MPRZ signal from the WPC circuit 65. The driver 34 transfers the MPRZ signal to the current zero control circuit 33. The current zero control circuit 33 controls the write driver 32 according to the MPRZ signal. The current zero control circuit 33 controls timing at which the write driver 32 starts current zero control.

The write driver 32 receives a data signal from the driver 64 of the RWC 60 and generates a write current according to the data signal, but when specified from the current zero control circuit 33, starts current zero control and sets the write current to zero. Then, the write driver 32 autonomously cancels the current zero control at the edge timing of the data signal, that is, at the timing at which the polarity of the write current should be inverted.

As the simplest implementation of the current zero control, the preamplifier 30 operates to set the write current Iw to zero at the state transition of the MPRZ signal, in other words, at the polarity inversion position (L level→H level or H level→L level). The polarity inversion position of the MPRZ signal of each nT pattern is set temporally before the polarity inversion position of the data signal by the delay circuit 63. The start timing of the current zero time of each nT pattern can be individually specified by adjusting the delay amount DL2 added to the MPRZ signal by the WPC circuit 65.

For example, the current zero control is performed as illustrated in FIGS. 8A to 8C. FIGS. 8A to 8C are waveform diagrams illustrating current zero control. FIG. 8A illustrates a bit sequence of write data generated by the write data generation circuit 61, a pattern recognition result (1T pattern to 6T pattern) thereof, and a data signal output from the delay circuit 63. FIG. 8B illustrates the MPRZ signal output from the WPC circuit 65. FIG. 8C illustrates the write current Iw generated by the write driver 32.

In the example of FIGS. 8A to 8C, a case where the track TR of the outer peripheral region OR is the target track TR is exemplified. The WPC circuit 65 of the RWC 60 operates with a 3-bit state branch of the previous record, and can control independent current zero time with four patterns of 1T pattern/2T pattern/3T pattern/nT pattern (n≥4). Note that the number of nT patterns to be independently controlled can be adjusted by increasing or decreasing the state branch of the WPC circuit 65 as necessary.

Immediately before the timing t9, the write current Iw=$I_H$ is established in response to the fact that the data signal is at the high level $V_{H1}$. The data signal is a signal obtained by adding the delay amount DL1 to the write data corrected by the WPC circuit 62.

At this time, the MPRZ signal is at a high level $V_{H2}$. In the WPC circuit 62, a delay amount DL2 (=DL1-$\Delta T_1$) is added to the write data corrected by the WPC circuit 62 in response to the second setting value WPC2_xx11 corresponding to the recognition result that the next data pattern is the 1T pattern "1". As a result, the RWC 60 adjusts the falling edge timing of the MPRZ signal to timing t9 corresponding to the 1T pattern.

At timing t9, the MPRZ signal transitions from the high level $V_{H2}$ to the low level $V_{L2}$. In response to this, the preamplifier 30 starts the current zero control and sets the write current Iw to zero.

At timing t10, the data signal transitions from the high level $V_{H1}$ to the low level $V_{L1}$. In response to this, the preamplifier 30 cancels the current zero control. As a result, the current zero time is controlled to $\Delta T_1$ corresponding to the 1T pattern.

The preamplifier 30 transitions the write current Iw from zero to the level $I_{US}$.

At this time, the MPRZ signal is at the low level $V_{L2}$. In the WPC circuit 62, a delay amount DL2 (=DL1-$\Delta T_1$) is added to the write data corrected by the WPC circuit 62 in response to the second setting value WPC2_xx11 corresponding to the recognition result that the next data pattern is the 1T pattern "0". As a result, the RWC 60 adjusts the falling edge timing of the MPRZ signal to timing t11 corresponding to the 1T pattern.

At timing t11, the MPRZ signal transitions from the low level $V_{L2}$ to the high level $V_{H2}$. In response to this, the preamplifier 30 starts the current zero control and sets the write current Iw to zero.

At timing t12, the data signal transitions from the low level $V_{L1}$ to the high level $V_{H1}$. In response to this, the preamplifier 30 cancels the current zero control. As a result, the current zero time is controlled to $\Delta T_1$ corresponding to the 1T pattern.

The preamplifier 30 transitions the write current Iw from zero to a level $I_{OS}$.

At this time, the MPRZ signal is at a high level $V_{H2}$. In the WPC circuit 62, a delay amount DL2 (=DL1-$\Delta T_2$) is added to the write data corrected by the WPC circuit 62 in response to the second setting value WPC2_x101 corresponding to the recognition result that the next data pattern is the 2T pattern "11". As a result, the RWC 60 adjusts the falling edge timing of the MPRZ signal to timing t14 corresponding to the 2T pattern.

At timing t13, the preamplifier 30 transitions the write current Iw from the level $I_{OS}$ to the high level $I_H$ assuming that the period to be maintained at the level $I_{OS}$ has elapsed.

At timing t14, the MPRZ signal transitions from the high level $V_{H2}$ to the low level $V_{L2}$. In response to this, the preamplifier 30 starts the current zero control and sets the write current Iw to zero.

At timing t15, the data signal transitions from the high level $V_{H1}$ to the low level $V_{L1}$. In response to this, the preamplifier 30 cancels the current zero control. As a result, the current zero time is controlled to $\Delta T_2$ corresponding to the 2T pattern.

The preamplifier 30 transitions the write current Iw from zero to the level $I_{US}$.

At this time, the MPRZ signal is at the low level $V_{L2}$. In the WPC circuit 62, a delay amount DL2 (=DL1-$\Delta T_3$) is added to the write data corrected by the WPC circuit 62 in response to the second setting value WPC2_1001 corresponding to the recognition result that the next data pattern is the 3T pattern "000". As a result, the RWC 60 adjusts the falling edge timing of the MPRZ signal to timing t17 corresponding to the 3T pattern.

At timing t16, the preamplifier 30 transitions the write current Iw from the level $I_{US}$ to the low level $I_L$ assuming that the period to be maintained at the level $I_{US}$ has elapsed.

At timing t17, the MPRZ signal transitions from the low level $V_{L2}$ to the high level $V_{H2}$. In response to this, the preamplifier 30 starts the current zero control and sets the write current Iw to zero.

At timing t18, the data signal transitions from the low level $V_{L1}$ to the high level $V_{H1}$. In response to this, the preamplifier 30 cancels the current zero control. As a result, the current zero time is controlled to $\Delta T_3$ corresponding to the 3T pattern.

The preamplifier 30 transitions the write current Iw from zero to a level $I_{OS}$.

At this time, the MPRZ signal is at a high level $V_{H2}$. In the WPC circuit 62, a delay amount DL2 (=DL1-$\Delta T_4$) is added to the write data corrected by the WPC circuit 62 in response to the second setting value WPC2_0001 corresponding to the recognition result that the next data pattern is the 4T pattern "1111". As a result, the RWC 60 adjusts the falling edge timing of the MPRZ signal to timing t20 corresponding to the 4T pattern.

At timing t19, the preamplifier 30 transitions the write current Iw from the level $I_{OS}$ to the high level $I_H$ assuming that the period to be maintained at the level $I_{OS}$ has elapsed.

At timing t20, the MPRZ signal transitions from the high level $V_{H2}$ to the low level $V_{L2}$. In response to this, the preamplifier 30 starts the current zero control and sets the write current Iw to zero.

At timing t21, the data signal transitions from the high level $V_{H1}$ to the low level $V_{L1}$. In response to this, the preamplifier 30 cancels the current zero control. As a result, the current zero time is controlled to $\Delta T_4$ corresponding to the 4T pattern.

The preamplifier 30 transitions the write current Iw from zero to the level $I_{US}$.

At this time, the MPRZ signal is at the low level $V_{L2}$. In the WPC circuit 62, a delay amount DL2 (=DL1-$\Delta T_4$) is added to the write data corrected by the WPC circuit 62 in response to the second setting value WPC2_0001 corresponding to the recognition result that the next data pattern is the 5T pattern "00000". As a result, the RWC 60 adjusts the falling edge timing of the MPRZ signal to timing t23 corresponding to the 5T pattern.

At timing t22, the preamplifier 30 transitions the write current Iw from the level $I_{US}$ to the low level $I_L$ assuming that the period to be maintained at the level $I_{US}$ has elapsed.

At timing t23, the MPRZ signal transitions from the low level $V_{L2}$ to the high level $V_{H1}$. In response to this, the preamplifier 30 starts the current zero control and sets the write current Iw to zero.

At timing t24, the data signal transitions from the low level $V_{L1}$ to the high level $V_{H1}$. In response to this, the preamplifier 30 cancels the current zero control. As a result, the current zero time is controlled to $\Delta T_4$ corresponding to the 5T pattern.

The preamplifier 30 transitions the write current Iw from zero to a level $I_{OS}$.

At this time, the MPRZ signal is at a high level $V_{H2}$. In the WPC circuit 62, a delay amount DL2 (=DL1-$\Delta T_4$) is added to the write data corrected by the WPC circuit 62 in response to the second setting value WPC2_0001 corresponding to the recognition result that the next data pattern is the 6T pattern "111111". As a result, the RWC 60 adjusts the falling edge timing of the MPRZ signal to timing t26 corresponding to the 6T pattern.

At timing t25, the preamplifier 30 transitions the write current Iw from the level $I_{OS}$ to the high level $I_H$ assuming that the period to be maintained at the level $I_{OS}$ has elapsed.

At timing t26, the MPRZ signal transitions from the high level $V_{H2}$ to the low level $V_{L2}$. In response to this, the preamplifier 30 starts the current zero control and sets the write current Iw to zero.

At timing t27, the data signal transitions from the high level $V_{H1}$ to the low level $V_{L1}$. In response to this, the preamplifier 30 cancels the current zero control. As a result, the current zero time is controlled to $\Delta T_4$ corresponding to the 4T pattern.

As described above, in the embodiment, in the disk device 1, the RWC 60 changes the current zero time according to the data pattern when performing the current zero control, and the preamplifier 30 sets the current zero time in response to the change. As a result, the current zero time $\Delta T_{MPRZ}$ can be individually adjusted according to each data pattern (for example, a 1T pattern to a 5T pattern), and the effect of improving the bit error rate by the MPRZ scheme can be optimized (for example, maximized). That is, the reliability of the information recorded in the disk 10 can be improved.

Further, in the embodiment, in the disk device 1, the RWC 60 adds the delay amount DL1 to the write data to generate the data signal, and adds the delay amount DL2 to the write data according to the data pattern to generate the MPRZ signal. The preamplifier 30 starts the current zero control at the edge timing of the MPRZ signal to set the amplitude of the write current to zero, and cancels the current zero control at the polarity inversion position of the data signal. As a result, since the current zero time can be adjusted by the difference between the two delay amounts DL1 and DL2, the current zero time $\Delta T_{MPRZ}$ can be adjusted with a resolution smaller than 1T.

Note that, as a modification of the embodiment, the disk device 1 may be configured to be switchable between execution and non-execution of the current zero control. For example, switching information 331 of the current zero control as illustrated in FIG. 9 may be set in the current zero control circuit 33 in the preamplifier 30. FIG. 9 is a diagram illustrating switching information 331 of current zero control in the modification of the embodiment.

As illustrated in FIG. 9, the current zero control circuit 33 in the preamplifier 30 determines whether or not to perform the current zero control according to the combination of the level (L level or H level) of the data signal and the state transition (transition from L level to H level or transition from H level to L level) of the MPRZ signal.

In the case of FIG. 9, the current zero control circuit 33 selectively performs the current zero control when the data signal is at the low level $V_{L1}$ and the state transition of the MPRZ signal is from the low level $V_{L2}$ to the high level $V_{H2}$, or when the data signal is at the high level $V_{H1}$ and the state transition of the MPRZ signal is from the high level $V_{H2}$ to the low level $V_{L2}$. This is based on the idea that this combination is expected in normal operation since the MPRZ signal is duplicated on the basis of the write data.

In the case of other combinations, it can be considered that the state transition of the MPRZ signal occurs at an unexpected timing due to jitter noise, an adjustment error, or the like. The current zero control circuit 33 does not perform the current zero control when the data signal is at the low level $V_{L1}$ and the state transition of the MPRZ signal is from the high level $V_{H2}$ to the low level $V_{L2}$, or when the data signal is at the high level $V_{H1}$ and the state transition of the MPRZ signal is from the low level $V_{L2}$ to the high level $V_{H2}$.

For example, as illustrated in FIGS. 4 and 5, in the outer peripheral region OR and the middle peripheral region MR, the current zero time $\Delta T_{MPRZ}$ at which the bit error rate is minimized in the 1T pattern is smaller than the current zero time $\Delta T_{MPRZ}$ at which the bit error rate is minimized in other data patterns. Therefore, the current zero time is controlled to a relatively small value for the 1T pattern.

Figure 10A:
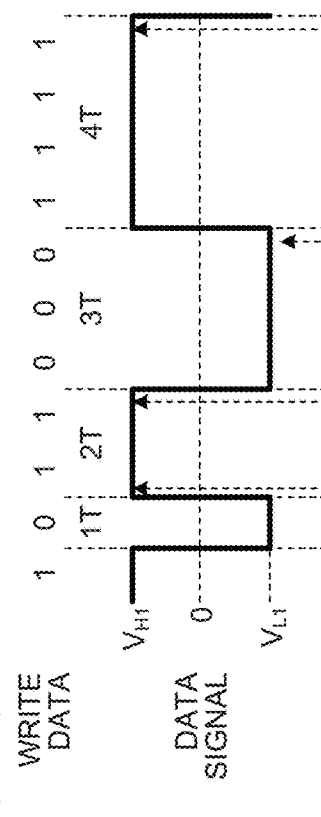
FIGS. 10A to 10F are waveform diagrams illustrating switching of the current zero control in the modification of the embodiment.
Figure 10B:
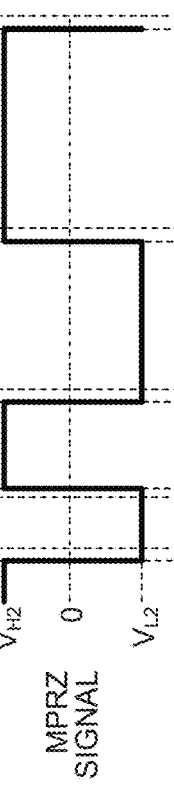
Figure 10C:
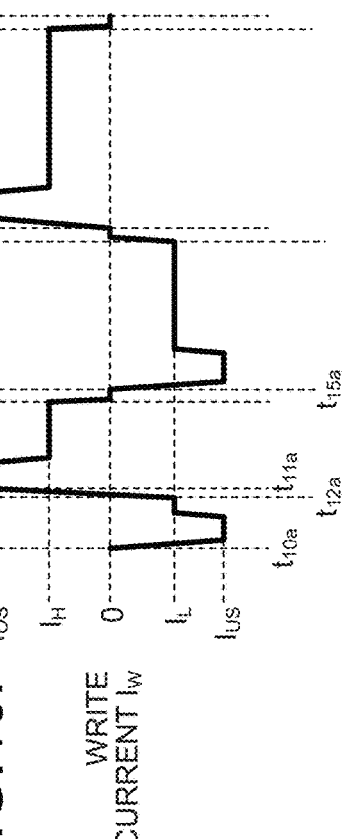

Even if the current zero time is controlled to a relatively small value, if the phase of the data signal and the phase of the MPRZ signal are appropriate, the current zero time can be appropriately set as illustrated in FIGS. 10A to 10C. The edge timing t11 corresponding to the 1T pattern in the MPRZ signal is positioned within the period from t10 to t12 corresponding to the data signal of the 1T pattern. Note that, FIGS. 10A to 10C are waveform diagrams illustrating switching of the current zero control in the modification of the embodiment, and correspond to the portions of timings t9 to t21 in FIGS. 8A to 8C.

At the edge timing t11 corresponding to the 1T pattern in the MPRZ signal, since the data signal is at the low level $V_{L1}$ and the state transition of the MRPZ signal is from the low level $V_{L2}$ to the high level $V_{H2}$, the current zero control is started according to the switching information (see FIG. 9), and the write current Iw=0. At the subsequent timing t12, the current zero control is canceled in response to the transition from the low level $V_{L1}$ to the high level $V_{H1}$ of the data signal. As a result, the current zero time can be appropriately set immediately before the polarity inversion position of the write current corresponding to the 1T pattern.

Figure 10D:
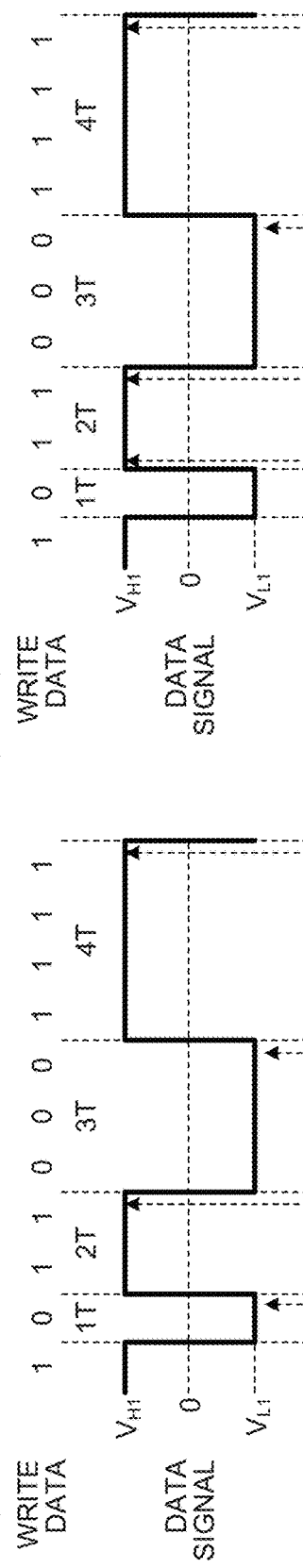
Figure 10E:
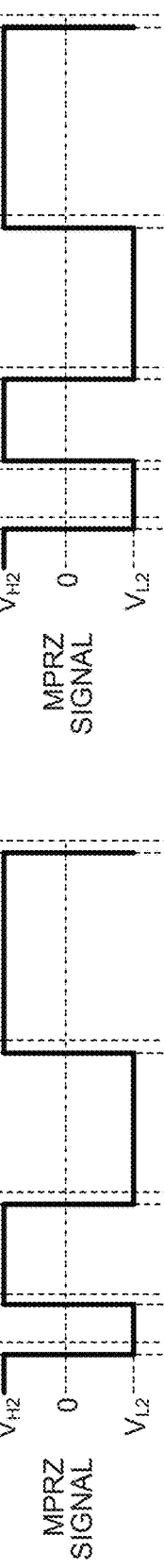
Figure 10F:
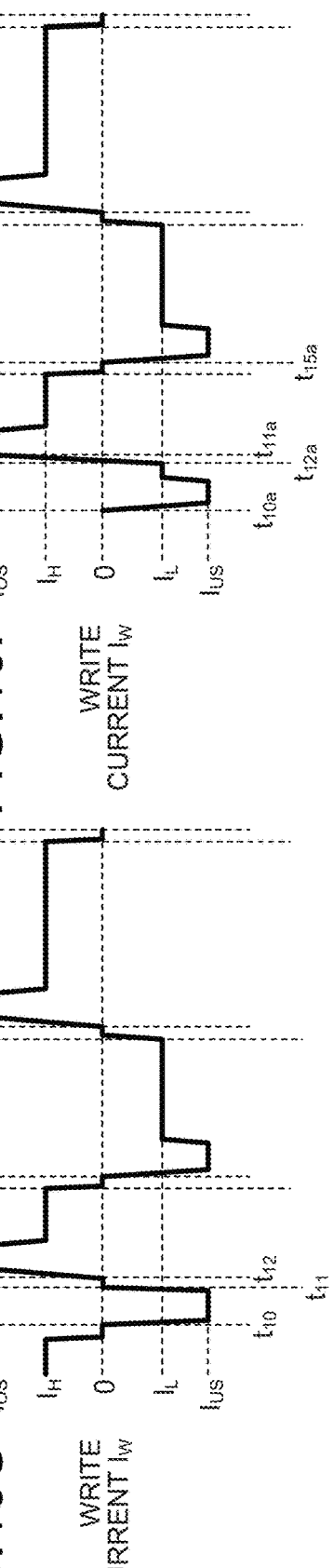

On the other hand, by controlling the current zero time to a relatively small value, there is a possibility that the phase of the data signal and the phase of the MPRZ signal are shifted back and forth due to the influence of jitter or the like as illustrated in FIGS. 10D to 10F. The edge timing t11a corresponding to the 1T pattern in the MPRZ signal is positioned after the period from t10a to t12a corresponding to the 1T pattern data signal has elapsed, that is, within the period from t12a to t15a corresponding to the 2T pattern data signal. FIGS. 10D to 10F are waveform diagrams illustrating switching of the current zero control in the modification of the embodiment, and correspond to the portions of timings t9 to t21 in FIGS. 8A to 8C.

If the current zero control is started at the edge timing t11a, the write current Iw becomes zero in most of the periods t12a to t15a corresponding to the 2T pattern, and there is a possibility that the 2T pattern "11" to be originally recorded is not recorded on the disk 10.

On the other hand, in the modification of the embodiment, at the edge timing t11a corresponding to the 1T pattern in the MPRZ signal, since the data signal is at the high level $V_{H1}$ and the state transition of the MRPZ signal is from the low level $V_{L2}$ to the high level $V_{H2}$, the current zero control is not started according to the switching information (see FIG. 9).

The write current Iw transitions from the low level $I_L$ to the level $I_{OS}$. As a result, it is possible to avoid the current zero control from being performed at an inadvertent timing.

Alternatively, in the RWC 60, the delay amount DL1 of the delay circuit 63 may be set to be smaller than the delay amount DL2 of the WPC circuit 65 for the 1T pattern and larger than the delay amount DL2 of the WPC circuit 65 for another pattern (2T or more patterns). In this case, by using the switching information 331 in FIG. 9 in combination, the current zero control is not selectively performed on the 1T pattern, and the current zero control can be performed on other patterns (2T or more patterns). As a result, the effect of improving the bit error rate can be optimized (for example, maximized) for the information written to the disk 10 according to the write current while avoiding the influence of jitter or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk device comprising:
a disk;
a head that writes information to the disk according to a write current;
a preamplifier that causes the write current to flow through the head; and
a controller capable of causing the preamplifier to perform current zero control for maintaining an amplitude of the write current at zero, and capable of changing a time for maintaining the amplitude of the write current at zero according to a pattern of write data,
wherein the controller adds a first delay amount to the write data to generate a first signal, and adds a second delay amount to the write data according to a pattern of the write data to generate a second signal.

2. The disk device according to claim 1, wherein
the second delay amount is smaller than the first delay amount.

3. The disk device according to claim 2, wherein
the controller adjusts a time for maintaining the amplitude of the write current at zero by a difference between the first delay amount and the second delay amount.

4. The disk device according to claim 1, wherein
the controller selects a candidate delay amount corresponding to the pattern of the write data among plural candidate delay amounts corresponding to plural patterns as the second delay amount, and adds the selected second delay amount to the write data to generate the second signal.

5. The disk device according to claim 1, wherein
the controller has setting information in which a data pattern and a setting value indicating a candidate delay amount are associated with each other for plural data patterns, selects a setting value according to the pattern of the write data and the setting information, and adds a second delay amount indicated by the selected setting value to the write data to generate the second signal.

6. The disk device according to claim 1, wherein
the controller selects a first candidate delay amount corresponding to the pattern of the write data among plural first candidate delay amounts corresponding to plural patterns as the first delay amount, adds the selected first delay amount to the write data to generate the first signal, selects a second candidate delay amount corresponding to the pattern of the write data among plural second candidate delay amounts corresponding to the plural patterns as the second delay amount, and adds the selected second delay amount to the write data to generate the second signal.

7. The disk device according to claim 1, wherein
the controller has first setting information in which a data pattern and a first setting value indicating a first candidate delay amount are associated with each other for plural data patterns, selects a first setting value according to the pattern of the write data and the first setting information, adds a first delay amount indicated by the selected first setting value to the write data to generate the first signal, has second setting information in which a data pattern and a second setting value indicating a second candidate delay amount are associated with each other for plural data patterns, selects a second setting value according to the pattern of the write data and the second setting information, and adds a second delay amount indicated by the selected second setting value to the write data to generate the second signal.

8. The disk device according to claim 1, wherein
the preamplifier generates the write current according to the first signal, and maintains an amplitude of the generated write current at zero from an edge timing of the second signal to a polarity inversion timing of the first signal.

9. The disk device according to claim 8, wherein
the preamplifier cancels the current zero control according to polarity inversion of the first signal.

10. The disk device according to claim 8, wherein
the controller adjusts the edge timing of the second signal according to the pattern of the write data.

11. The disk device according to claim 8, wherein
the preamplifier generates the write current according to the first signal, starts the current zero control from an edge timing of the second signal, and cancels the current zero control at a polarity inversion timing of the first signal.

12. The disk device according to claim 8, wherein
the preamplifier includes:
a first circuit that generates the write current according to the first signal; and
a second circuit that controls the first circuit to start the current zero control from an edge timing of the second signal, and
the first circuit cancels the current zero control at a polarity inversion timing of the first signal.

13. The disk device according to claim 8, wherein
the preamplifier generates the write current according to the first signal, starts the current zero control from an edge timing of the second signal when a combination of a level of the first signal and a state transition of the second signal is a first combination, cancels the current zero control at a polarity inversion timing of the first signal, and does not perform the current zero control when a combination of a level of the first signal and a state transition of the second signal is a second combination.

14. The disk device according to claim 8, wherein
the preamplifier includes:
a first circuit that generates the write current according to the first signal; and
a second circuit that controls the first circuit to start the current zero control from an edge timing of the second signal when a combination of a level of the first signal and a state transition of the second signal is a first combination, and controls the first circuit not to perform the current zero control when a combination of a level of the first signal and a state transition of the second signal is a second combination, and
the first circuit cancels the current zero control at a polarity inversion timing of the first signal in a case where the current zero control is performed.

15. A disk device comprising:
a disk;
a head that writes write data to the disk according to a write current;
a preamplifier that supplies the write current to the head and is capable of maintaining an amplitude of the write current at zero for a predetermined period; and
a controller that sets the predetermined period to a first period in a case where a pattern of the write data is a first pattern, and is capable of setting the predetermined period to a second period different from the first period in a case where the pattern of the write data is a second pattern different from the first pattern.

16. The disk device according to claim 15, wherein
the first pattern has a first bit length,
the second pattern has a second bit length longer than the first bit length, and
the second period is longer than the first period.

17. The disk device according to claim 16, wherein
in a case where the pattern of the write data is a third pattern different from both the first pattern and the second pattern, the controller is capable of setting the predetermined period to a third period different from both the first period and the second period.

18. The disk device according to claim 17, wherein
the third pattern has a third bit length longer than the second bit length, and
the third period is longer than the second period.

19. The disk device according to claim 17, wherein
the third pattern has a third bit length longer than the second bit length, and
the third period is shorter than the second period and longer than the first period.

* * * * *